Sept. 2, 1941.  L. HARRIS ET AL  2,254,962
UNITARY LENS SYSTEM
Filed Sept. 22, 1937  4 Sheets-Sheet 2
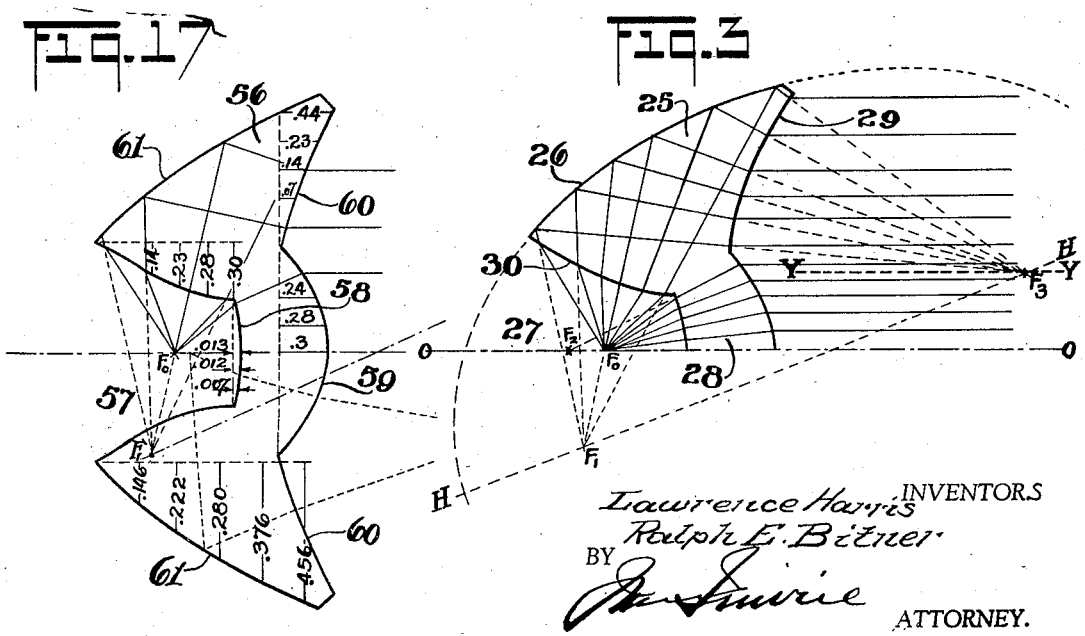
INVENTORS
Lawrence Harris
Ralph E. Bitner
BY
ATTORNEY.

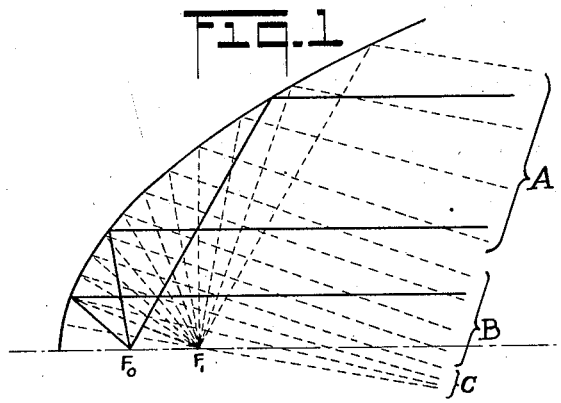
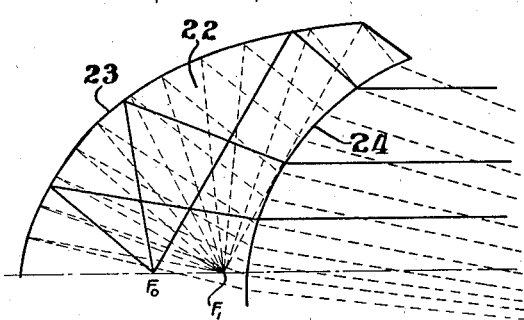
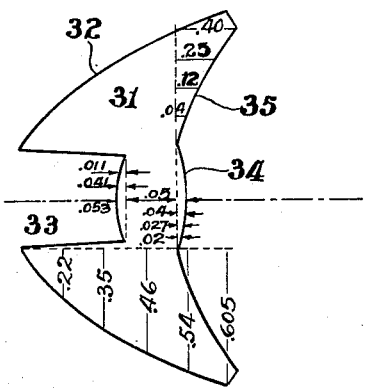
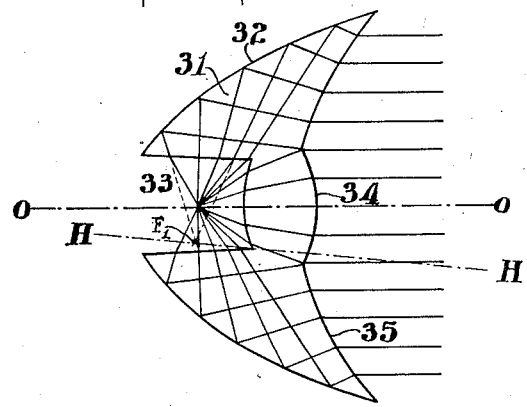
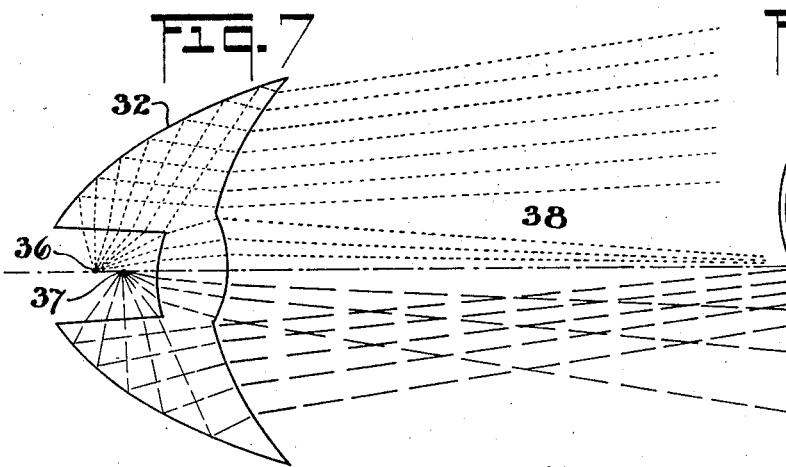
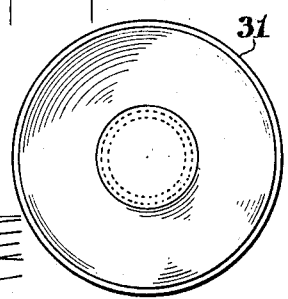
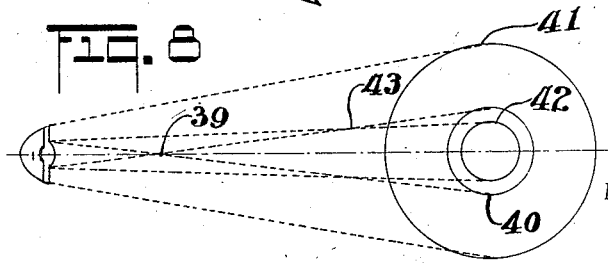

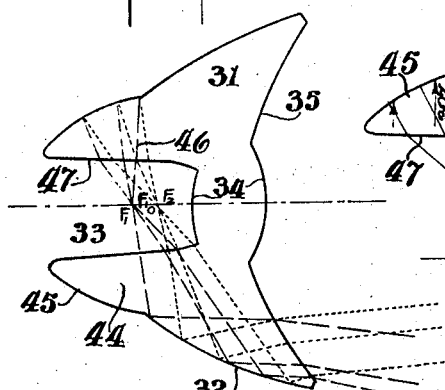
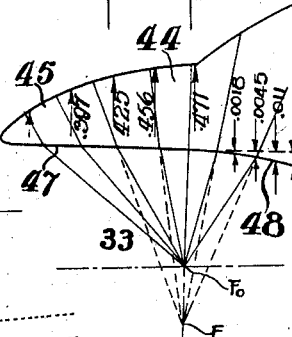
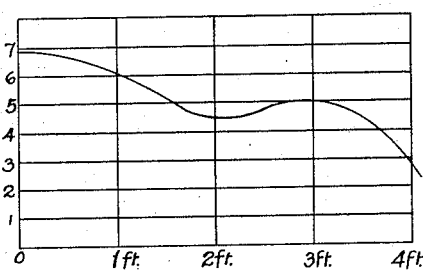
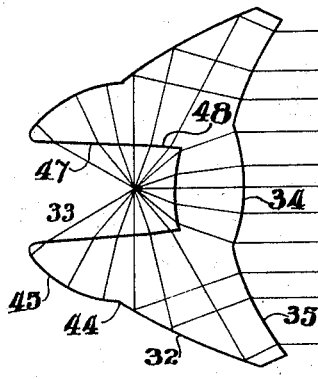
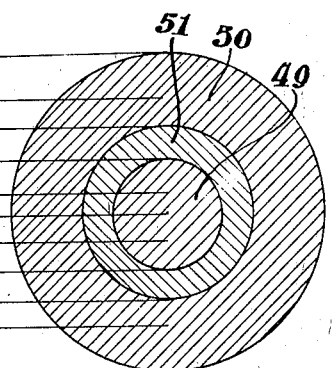
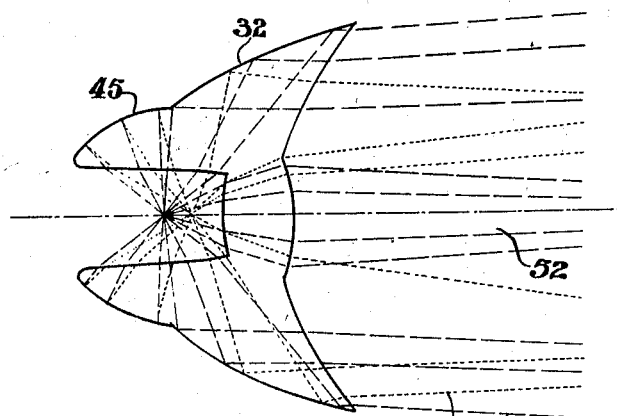
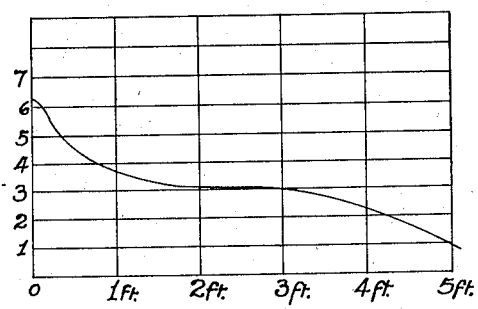

Sept. 2, 1941. L. HARRIS ET AL 2,254,962
UNITARY LENS SYSTEM
Filed Sept. 22, 1937 4 Sheets-Sheet 4
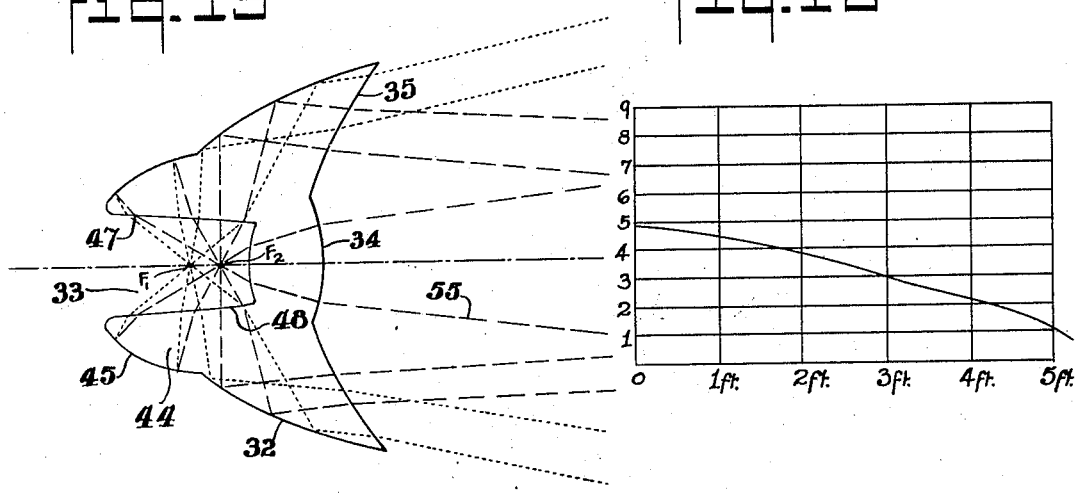
INVENTORS
Lawrence Harris and
Ralph E. Bitner
BY
ATTORNEY.

Patented Sept. 2, 1941

2,254,962

UNITED STATES PATENT OFFICE 2,254,962

UNITARY LENS SYSTEM

Lawrence Harris and Ralph E. Bitner, New York, N. Y., assignors to George M. Cressaty, New York, N. Y.

Application September 22, 1937, Serial No. 165,182

7 Claims. (Cl. 240—106.1)

This invention relates to an improvement in lenses designed and constructed with a view to providing in a single unitary element a lens system which will utilize substantially all of the light of the light source and will direct the same in a uniform controlled beam in which the light rays are evenly distributed throughout the full lighted area.

The primary object of the invention is the provision of a unitary lens system involving a single casting particularly constructed so that all the light rays from the light source are projected in substantially parallel relation without spherical aberration.

A further object of the present invention is the provision of a casting of glass or other transparent material providing a single unitary structure in which, in the several forms to be described, there is decided improvement in the volume of light in that all or substantially all of the rays from the light source are finally projected into the light beam and a complete avoidance of any failure of such rays within the area of such light beam, to avoid the well known and heretofore unavoidable black spot or failure of rays within the illuminated area, particularly where the relative adjustment of the light source and the lens system provides for and permits a material increase in the spread of said beam.

A further object of the invention is the provision of a unitary lens system as an integral formation, wherein the structure serves as a reflector not only for the forwardly directed rays from the light source but also for the rearwardly directed rays from such source, and the conversion of all such rays into the rays necessary to provide the desired light zone; the particular utilization and projection of such rays from the light source affording the maximum intensity of light possible from the source, and further insuring the control of the rays to afford complete and substantially uniform lighting of said zone, whether in its normal area or in its spread area.

Another object of the invention is the provision of a single casting or molded body formed to provide a plurality of reflecting and refracting surfaces and lens formations which will so control the light rays as to provide the desired results.

Still another object of the invention is the provision of a lens unit which may be constructed to provide for the projection of non-symmetrical beams with even distribution or and maximum efficiency of the light rays in such beam.

A further object of the invention is the provision of a lens unit in which practically 100% of available light is used while at the same time the use of a metallic reflector is unnecessary and avoided; and further the avoidance of the necessity of even silvering the reflective surface in a majority of the forms provided.

A further object of the invention is to so construct the lens unit as to permit convenient and inexpensive manufacture without sacrificing any of the optical advantages.

To aid a fuller understanding of the invention, the accompanying drawings are included in which:

Figure 1 is an illustrative diagram of a parabolic reflector with lines indicating the beam resulting from the several sections of such reflector when the light source is in and out of normal focus.

Figure 2 is an illustrative diagram of an elliptical reflector-refractor, with the beam resulting when both in and out of focus for comparison with the diagram of Figure 1.

Figure 3 is a sectional view of a lens showing the various surfaces of an elliptical reflector-refractor described in Figure 2.

Figure 4 is a face view of the lens of Figures 5 and 6.

Figure 5 is a view of a lens unit constructed in accordance with one form of the invention, and illustrating the elliptical reflector-refractor described in Figure 3, the dimensions of the various sections being marked in inches.

Figure 6 is a view similar to Figure 5, the light projection being illustrated with the source of light in focus.

Figure 7 is a view similar to Figure 5, the light projection being illustrated with the source out of focus in two different positions.

Figure 8 is a diagram showing the light distribution in the beam of that out of focus position illustrated in the upper half of Figure 7.

Figure 9 is a diagram of the light distribution with the source in the out of focus position illustrated in the lower half of Figure 7.

Figure 10 is a detail of an additional reflective section for use with the lens of Figure 5.

Figure 11 is a view of the lens of Figure 5 combined with the additional reflective section of Figure 10, showing light projection and beam when the source is in focus.

Figure 12 is a diagram of a lens constructed as in Figure 5 with the additional reflective section of Figure 10, indicating the control of the light rays by such additional section.

Figure 13 is a lens similar to that of Figure 11 showing the projection of the light rays when the source is in the rear of the normal focus.

Figure 14 is a diagram of light intensity and distribution of the beam projected by the lens of Figure 13.

Figure 15 is a view of Figure 11 with an indication of the projection of the light rays when the source is in advance of the normal focus.

Figure 16 is a diagram of light intensity and distribution in the beam projection of the lens of Figure 15.

Figure 17 is a view of a lens unit constructed in accordance with one form of the elliptical reflector-refractor shown in Figure 3, the construction being slightly modified over the form of Figures 5 and 11.

It has been heretofore proposed in the provision of a lens unit to produce parallel rays without spherical aberration, to use the principle of the parabolic curve for the reflection of the marginal rays from the light source and to combine this type of reflective curve with a central lens section for refracting the paraxial rays, with such central lens section formed on elliptical, aspherical or hyperboloid curve.

In the present application the principle of the reflection of the parabolic curve is replaced by the principle of reflection of curves of hyperboloids of revolution, elliptical, or modified elliptical surfaces which are combined with various types of central lens sections for the paraxial rays, with the type depending on the form and shape of the unit.

Figure 1 is used to illustrate the action of a parabolic reflector in order to provide a comparative basis for the consideration of the following lens units wherein an elliptical or modified elliptical surface is utilized to produce the marginal or reflected rays as a substitute for hyperbolas of the form previously described. The use of a parabolic reflector when the light is at the focus at $F_0$, the reflected rays are parallel, as indicated in full lines. However, when the source is out of focus, as for example as indicated at $F_1$, the result is a non-uniform area in the beam for the reason that there are three zones of light rays; first, in the section marked A where the rays are divergent; second, in the section marked B where they are parallel; and third, in the section marked C where they are convergent. The divergent rays from the section A of course produce a wide beam illumination, while the convergent rays from the section marked C cross each other and spread out to provide a similar wide beam illumination. The parallel rays, however, from the section marked B produce a ring of intense illumination which is a well known incident in the use of a parabolic reflector when the light source is out of focus. Changing the relation of the non-focal position relative to the true focal position merely shifts the parallel rays to another section of the reflector.

In a more or less diagrammatic illustration, Figure 2 presents the comparative action of an elliptical reflector-refractor over a parabola. The lens 22 has an elliptical reflecting surface 23 and an elliptical refracting surface 24 on its forward face. When the light source is at the normal focus $F_0$, the light rays are parallel, as indicated in full lines. With the source out of focus, to the same extent as in Figure 1, all the projected rays are convergent. These converging rays cross the optical axis a short distance in front of the lens and then spread to form a beam which is substantially equally illuminated. As there are no parallel rays, there is no consequent intensely illuminated ring as in Figure 1 and therefore there is no dark zone within the area illuminated.

The relations of the various surfaces of the above elliptical reflector-refractor are shown in Figure 3. The lens body indicated as 25 is provided with a well 27 to receive the light source, a central lens section 28, a surface 30 for the annular wall of the well and a marginal section 26 which is substantially elliptical and provides the reflecting surface. This reflecting surface 26 has one focus at $F_1$ and a second focus at $F_3$, both focii being on an axis indicated at H—H which is inclined to the optical axis O—O.

The rays which leave the reflecting surface 26 converge toward the point $F_3$. In order to convert them into a parallel beam, a rectifying-refracting surface 29 is used. This surface 29 is the segment of an ellipse, its eccentricity equal to the reciprocal of the refractive index of the medium, having the point $F_3$ as its focus which is one of the focii of the surface 26 and with its axis Y—Y passing through this focal point but parallel to the optical axis.

The position of the focii $F_1$ and $F_3$ on the axial line H—H depends on several design features which must be considered. These are first, the maximum angle possible for total reflection; second, the allowable diameter of the lens; and third, the refracting or rectifying properties of the surface 29. The surface 26 must present an angle so that total reflection occurs over the entire surface. Its axis H—H must be tilted to an angle to the optical axis O—O to make the angle of incidence on the surface 26 greater than the critical angle. But if this surface 26 is to be silvered, then its axis H—H may be placed so that it is parallel to the axis O—O, or even tilted in a reverse direction as shown at H—H in Figure 6. This will decrease the overall diameter of the unit and at the same time give the same efficiency. The diameter of the lens may also be decreased by using the segment of an ellipse having smaller eccentricity. This will necessarily compel a more severe curvature for the surface 29, rendering the lens more fragile and difficult to manufacture.

In Figures 4, 5 and 6 we illustrate first, complete lens units utilizing the factors and relations shown in Figures 2 and 3 when the reflecting surface 26 is to be silvered. The lens unit, indicated as 31 in each of the Figures 4, 5 and 6, has an elliptical reflecting margin 32 having one of its focii at the virtual focus $F_1$ on the axial line H—H tilted and below the optical axis O—O, and a second focus at a point approximately four inches in advance. The lens unit is provided with a light-receiving well 33, a double convex lens 34 for the par-axial rays, with the surfaces of this central lens section 34 on a hyperbolic curve, and with an annular surface 35 beyond and concentric with the central lens section, with such surface 35 as the segment of an ellipse. The light rays passing from the light source through the glass body are rendered parallel by the hyperbolic double convex lens section while the rays passing through the slightly curved annular wall of the well are refracted and then reflected at an angle to the axis of the lens from the elliptical marginal surface 32, and directed to the other focus of this surface 32 which is in advance of the true focus and are projected in lines parallel to the optical axis. The double convex central lens provides a greater illumination at the center of the beam zone, which is a desired effect, as the rays from the source have had less chance to diverge before striking the outer central lens section. The outside rays, after being reflected by the surface 32 and refracted by the surface 35, produce a side illumination, indicated more particularly in Figure 11. If the distance between the two focii of the elliptical surface 35 is changed, it is of course apparent that various concentrations of beam may be obtained.

The lens of Figures 4, 5 and 6 produces an even beam spread over an enlarged area when the light source is moved to an out of focus position. These variations are shown in Figure 7 wherein the lens of Figures 5 and 6 is duplicated with the same reference numerals. The dotted lines in the upper half of Figure 7 show the paths of light ray control when the light source is moved to the rear of the focal point, as at 36, while the dash lines in the lower half of Figure 7 indicate the light ray control when the focus is moved in advance of the normal focus, as at 37. When the light source is moved to the rear of the normal focus, as at 36, the par-axial rays passing through the central lens section converge, form an image on the optical axis, and then diverge. The marginal rays strike the reflecting surface 32 at relatively different angles; they are all projected through an angular displacement away from the optical axis of the lens, and are slightly divergent. When the light source is moved to the front of the normal focus, for example to point 37, the par-axial rays are divergent, while the marginal rays converge toward the axis, cross it, and focus on the other side, finally diverging and overlapping the rays of the other field. In practice, the most useful and uniform beams are thus produced. The two pencils of light, paraxial and marginal, blend into each other to form a uniform pattern with maximum intensity at the center. This is graphically illustrated in Figure 9, made at approximately 10 feet distance and approximately 4 feet in width. The marginal notations at the left are for intensity and at the bottom to indicate distribution spread.

In the ray projection and control in the upper half of Figure 7, there appears an area 38 in which there would be no illumination. However, with one pencil of rays convergent and the other divergent, the projected beam provides an evenly illuminated field. This is more graphically illustrated in Figure 8 wherein the central or par-axial rays come to a focus at 39 and then widen out to form a spot of illumination within the area defined by the circular outline 40. The marginal rays diverge and widen to form a circle of illumination, indicated at 41, and thus apparently result in a non-illuminated dark spot 42. However, when the two beam pencils leave the lens they are separated up to the point 43 where they merge and cross each other. Consequently any field beyond the point 43 will have no dark spot as the spread of the axial rays is greater than the spot 42. Furthermore, in practice, the filament of the light source, which is of appreciable size causes the two pencils of rays to blend together with no abrupt change of illumination.

If it is desired to obtain a higher intensity of illumination with the lens unit just described, an additional reflective extension 44 may be added as illustrated in Figures 10 and 12, which extension would gather still more available rays and would definitely increase the efficiency of the lens which is already high. The additional extension with dimensions in inches is indicated more particularly in Figure 10, while the lens provided with such extension is shown in Figures 11 and 12. The reflective surface 45 of the extension 44 is spherical or aspherical and is designed to gather rays for projection into the beam which are not directly available in the form of the lens as constructed in Figures 4 to 7. The rays of light indicated at 46 in Figure 12, from the light source are directed back toward the light source from the reflecting surface 45 but as they then move in opposite directions from the initial rays, they continue past the light source and are reflected from the surface 32 and through the surface 35 and become part of the light beam.

If light rays which originate at focus $F_0$ having a virtual focus at $F_1$, pass through a plane surface, they acquire spherical aberration. This plane surface 47 constituting the annular surface of the well 33 must therefore be corrected to eliminate spherical aberration. This surface is shown corrected in that its forward portion is curved at 48 and its rear portion made of aspherical curve so that the surface 45 is normal to the reflected rays passing through the surface 47 and the rays are returned to the focal point $F_0$.

The reflective surface 45 is of course effective when the light source is at the normal focus, and takes care of all the light from the filament in the back hemisphere in the source of illumination, as illustrated in Figure 11. The beam has three zones, one a central spot 49 due to the lens on the axis, and a second an annular ring 50 across the central spot. The intermediate zone 51 receives light scattered from the marginal and central beams plus that from the filament spread. The overlapping of the rays in this manner causes equal and even illumination over the whole field.

The additional lens 44 is also effective when the light source is away from the focal point, and this whether the source is moved to the rear of or to the front of the focus. Figure 12 shows the light rays when the light source is moved to the rear of the normal focus. Three rays indicated by dotted lines directed to the reflective surface 45 are reflected back to the main reflective surface 32, these rays being focused at a point $F_2$ which is as far in front of the normal focal point $F_0$ as a presumed rearwardly adjusted focus $F_1$ is behind the normal focus. This is true also when the filament is moved in front of the normal focus as, for example, to $F_2$, in which event the reflected rays would be focused at $F_1$. The reflected rays crossing the point of virtual focus continue as if they originated at such virtual focus and are reflected by the surface 32 and converge towards the optical axis in leaving the unit. The other three rays shown in this figure and indicated in dash lines are directed from the light source in rear of the normal focus and are reflected by the surface 32 and diverge on leaving the unit.

This will result in a beam effect without striations or black spots in the illuminated area, as will be plain from Figures 13 and 14. Figure 13 shows the projected rays more particularly, the lens unit being identical with the lens unit of Figure 12 and the parts having the same reference characters. From Figure 13 it will be noted that there are three sets of rays making up the beam. First the light rays which pass through the central lens section indicated at 52; second the light rays direct from the filament to the reflecting surface 32, indicated at 53; and third the rays from the reflective surface 45 indicated at 54. The rays 52 converge, and diverge and overlap the other field. The remaining beams 53 and 54 are reflected from the surface 32 at different angles, one converging and the other diverging. Thus, all three sets of rays overlap each other, producing a substantially uniformly illuminated field. This field covers a somewhat larger diameter than usual, as shown in the graph of Figure 14, with the figures at the left for intensity and the ones at the bottom for beam spread.

With this unusual beam result when the source is moved back of its focus, it is obvious that this lens unit gives a still better result when the source is moved to the front of said focus as shown in Figure 15 with the light source at point $F_2$. Here the ray projection from the marginal reflectors is similar to that of Figures 12 and 13 but the rays from the central lens section 34 instead of converging and crossing in advance of the lens unit, diverge immediately, as indicated at 55. This immediately eliminates the bright spot in the center of the beam. A graph of one-half of the light distribution of the lens of Figure 15 is shown in Figure 16, the numerals at the left indicating light intensity and the ones at the bottom are for beam spread.

Figure 17 illustrates a complete lens unit utilizing the factors and relations shown in Figures 2 and 3 when all rays from the focus strike the reflecting surface 26 at an angle greater than the critical angle for total reflection and therefore this surface 26 does not have to be silvered. The lens body indicated at 56 has a light source receiving well 57 in its rear portion, with a central lens section, the inner and outer faces 58 and 59 of which are of elliptical curvature. The annular front face 60 of the lens is an elliptical surface and the marginal reflective surface 61 is an elliptical surface of revolution so constructed as to have one of its focii at the virtual focus $F_1$, which virtual focus is located beyond the optical axis. The line joining these two focii is the axis of the reflecting ellipse and it is at an angle to the optical axis and crosses it just in front of the central lens. Here too, the light rays are divided into two sectors. In one, the rays around the optical axis are focused by the central lens system, the curvatures of which are proportioned so as to afford a slightly increased brightness in the center of the beam zone. The remaining rays of the other sector pass through the curved wall of the well, are refracted to the reflecting surface 61, and reflected from this surface toward the virtual focus of that surface. However, these light rays pass through the elliptical surface 60, the curvature of which is such as to refract such rays into parallelism for beam projection. In this type of lens, when the light source is in focus, the central portion of the beam has maximum intensity, and beyond the central portion the intensity is lowered to a predetermined minimum over a definite area beyond the optical axis. In a direction farther from the optical axis a second maximum beam intensity is reached due to the central rays from the surface 60, and from this second point of maximum intensity the light intensity gradually decreases toward the outer edge of the beam.

When the source is out of focus forwardly of the normal focus, the rays through the central lens unit diverge. The marginal rays converge after leaving the surface 60, cross the optical axis and then diverge. The resulting illumination is a blending of these two light sectors evenly distributed. When the source is moved to the rear of the focus, the rays from the surface 61 converge and the rays from the surface 60 diverge. The rays passing through the central lens system 59 cross the optical axis in advance of the lens unit and then rapidly diverge. The central rays thus fill in what would otherwise be a spot of reduced illumination or dark area, incident to the divergence of rays from the surface 60. At a predetermined distance in advance of the lens unit, the rays overlap and merge forming a wide spot of fairly even illumination. This particular construction is important in that it provides a design which is probably more easily manufactured than the lens unit shown in Figure 11. The construction is less fragile but it will be apparent from the plotted illumination curve, that the efficiency of this lens is slightly less than that of Figure 11. This is due, incidentally, to the fact that the unit of Figure 17 does not surround the source of light as completely as the one of Figure 11 in which latter all the available light from the bulb type lamp is gathered by the lens.

While a detailed portrayal has been given of some of the forms the invention may take, not only in its optical characteristics but also its mechanical features, it is not intended to limit the invention to the above description. The nature of the invention is such that it may be used in connection with a multitude of different flashlights, spotlights, lanterns, varying in size and shape, with a multitude of different headlights, lamp fixtures, or any other type of light projectors. Optical closures may be used or made of glass or any other transparent material. Various modifications, change or rearrangement of parts may be made in order to vary the light distribution or any other such alterations, without departing from the spirit of the invention and the scope of the appended claims.

What is claimed to be new is:

1. A lens unit having a well to receive a source of light, said lens also having a central refractive surface for paraxial rays, and an elliptical reflective surface and elliptical refractive surface for the marginal rays, all rays being projected in a single beam of light, both elliptical surfaces having the same virtual focus.

2. A lens unit having a well to receive a source of light, said lens also having a central refractive surface for paraxial rays, and an elliptical reflective surface and elliptical refractive surface for the marginal rays, all rays being projected in a single beam of light, both elliptical surfaces having the same virtual focus, the elliptical reflective surface having an additional virtual focus beyond the normal focus of the unit.

3. A lens unit, having a well to receive a source of light, said lens also having a central refractive surface for paraxial rays, and an annular marginal portion having substantially elliptical rear and front surfaces, the rear annular surface having virtual focii on an axis inclined to the optical axis of the unit, and the front annular surface having as its focus one of the focii of the rear annular surface.

4. A lens unit, having a well to receive a source of light, said lens also having a central refractive surface for paraxial rays, and an annular marginal portion having substantially elliptical rear and front surfaces having the same virtual focus, the rear marginal surface having the axis of its ellipse at an angle to the optical axis of the unit.

5. A lens unit, having a well to receive a source of light, said lens also having a central refractive surface for paraxial rays, and an annular marginal portion having substantially elliptical rear and front surfaces having the same virtual focus, the front marginal surface having the eccentricity of its elliptical curvature substantially equal to the reciprocal of the refractive index of the medium from which the lens unit is formed.

6. A lens body made of glass or other transparent material having a well with an outwardly curved margin in its rear face, a central lens section, an elliptical margin and an annular elliptical section surrounding the central lens section, the elliptical margin having the axis of its ellipse at an angle to the optical axis of the unit.

7. A unitary lens made of glass or other transparent material having a forward face formed as a central non-spherical lens and an annular margin inclined to the optical axis of the lens body, an outer margin having a forward elliptical section, and a light-source receiving well at the rear of the lens body, the annular margin and elliptical section having the same virtual focus.

LAWRENCE HARRIS.
RALPH E. BITNER.